(12) United States Patent
Schmidt et al.

(10) Patent No.: US 9,457,736 B2
(45) Date of Patent: Oct. 4, 2016

(54) PILLAR COVERING FOR MOTOR VEHICLES

(75) Inventors: Sebastian Schmidt, Stuttgart (DE); Luc-Henry Blanche, Schwaikheim (DE); Ulrich Riegler, Lindhorst (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/241,628

(22) PCT Filed: Sep. 4, 2012

(86) PCT No.: PCT/EP2012/067199
§ 371 (c)(1),
(2), (4) Date: Apr. 9, 2014

(87) PCT Pub. No.: WO2013/041369
PCT Pub. Date: Mar. 28, 2013

(65) Prior Publication Data
US 2014/0284954 A1    Sep. 25, 2014

(30) Foreign Application Priority Data

Sep. 23, 2011 (EP) .................................... 11182543

(51) Int. Cl.
*B60R 13/04* (2006.01)
*B62D 25/04* (2006.01)
*B60R 13/02* (2006.01)
(Continued)

(52) U.S. Cl.
CPC ............... *B60R 13/04* (2013.01); *B29C 45/16* (2013.01); *B60R 13/025* (2013.01); *B62D 25/04* (2013.01); *B29C 33/44* (2013.01); *B29C 45/0025* (2013.01); *B29L 2031/3005* (2013.01)

(58) Field of Classification Search
CPC ... B60R 13/025; B60R 13/04; B60R 13/043; B60R 13/06; B60J 5/04; B60J 5/0402; B60J 5/0481; B62D 25/04
USPC .................. 296/1.07, 1.08, 93, 146.9, 181.2; 49/500.1, 501
See application file for complete search history.

(56) References Cited

U.S. PATENT DOCUMENTS 4,597,931 A    7/1986   Watanabe et al.
5,571,581 A    11/1996  Koizumi et al.
(Continued)

FOREIGN PATENT DOCUMENTS

DE    3831274    3/1989
DE    4219344    12/1992
(Continued)

OTHER PUBLICATIONS

Quickparts Learning Center Basics of Injection Molding, as existed on Aug. 8, 2011, retreived from the Internet Archive Wayback Machine at http://web.archive.org/web/20110808175617/http://www.quickparts.com/LearningCenter/BasicsofInjectionMoldingDesign.aspx#draft.*
English translation of DE 10 2008056 146, retreived Apr. 14, 2015 from Espacenet via Patenttranslate.*
(Continued)

*Primary Examiner* — Jason S Daniels
(74) *Attorney, Agent, or Firm* — Steinfl & Bruno LLP

(57) ABSTRACT

A pillar covering for motor vehicles is described. The cover has a carrier part having a projected integrated window guide web and a projecting mounting element, an elevated circular, oval, or polygonal surface structure on the window guide web and/or the mounting element, and a polymer cover part connected to the carrier part via a contact surface.

16 Claims, 6 Drawing Sheets

Figure 1:
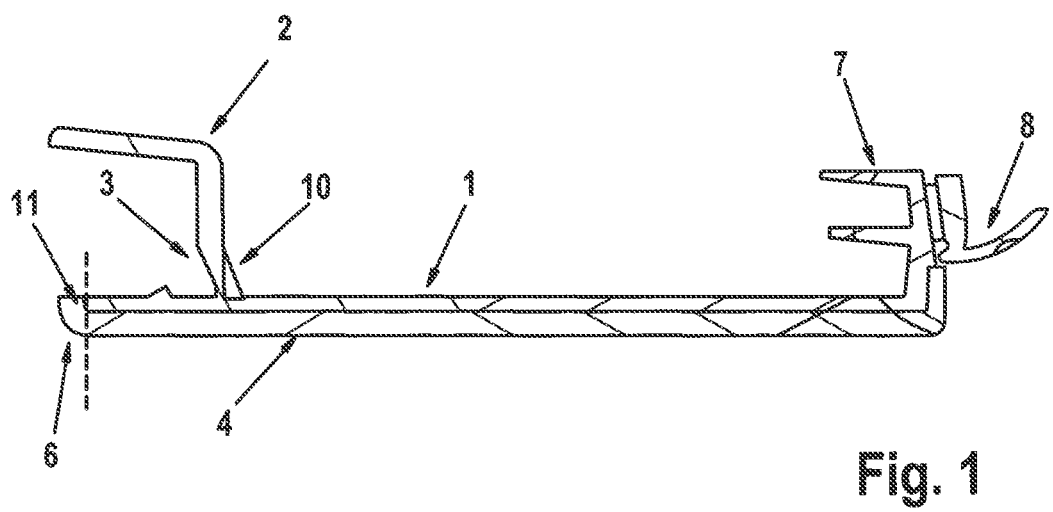

(51) Int. Cl.
  *B29C 45/16*   (2006.01)
  *B29C 45/00*   (2006.01)
  *B29L 31/30*   (2006.01)
  *B29C 33/44*   (2006.01)

(56) References Cited

U.S. PATENT DOCUMENTS

| | | | |
|---|---|---|---|
| 6,103,168 A * | 8/2000 | Kelly | 264/259 |
| 7,267,190 B2 | 9/2007 | Hirano | |
| 2009/0267373 A1 * | 10/2009 | Gerndorf et al. | 296/1.08 |
| 2010/0115851 A1 * | 5/2010 | Nakao et al. | 49/502 |
| 2011/0148139 A1 * | 6/2011 | Gerndorf et al. | 296/146.7 |
| 2011/0148150 A1 * | 6/2011 | Gerndorf et al. | 296/193.06 |

FOREIGN PATENT DOCUMENTS

| | | | |
|---|---|---|---|
| DE | 19633959 | | 2/1997 |
| DE | 19722551 | | 12/1998 |
| DE | 20201528 | | 6/2003 |
| DE | 202004006873 | | 7/2004 |
| DE | 102007024149 | | 11/2008 |
| DE | 102008056146 | A1 * | 5/2010 |
| EP | 1695808 | | 8/2006 |
| EP | 2272718 | | 1/2011 |
| GB | 2209702 | | 5/1989 |
| JP | S58161674 | A | 9/1983 |
| JP | 2003320904 | A | 11/2003 |
| JP | 2007277485 | A | 10/2007 |
| JP | 2007332262 | A | 12/2007 |
| JP | 2009029252 | | 2/2009 |
| JP | 2009143520 | A | 7/2009 |
| JP | 2009191821 | A | 8/2009 |
| JP | 4353415 | B2 | 10/2009 |
| JP | 2009248640 | A | 10/2009 |
| JP | 4366635 | B2 | 11/2009 |
| WO | WO 9605984 | A1 * | 2/1996 |
| WO | 2006/094484 | | 9/2006 |

OTHER PUBLICATIONS

English translaton of Japanese priority document JP 08-058507; retreived Jan. 6, 2016 from the Japan Platform for Patent Information.*
Written Opinion mailed on Dec. 6, 2012 for PCT/EP2012/067199 filed on Sep. 4, 2012 in the name of Saint-Gobain Glass France (German original with English Translation).
PCT International Search Report mailed on Dec. 5, 2012 for PCT/EP2012/067196 filed on Sep. 4, 2012 in the name of Saint-Gobain Glass France.
PCT International Search Report mailed on Dec. 5, 2012 for PCT/EP2012/067198 filed on Sep. 4, 2012 in the name of Saint-Gobain Glass France.
International Search Report mailed on Dec. 6, 2012 for PCT/EP2012/067199 filed on Sep. 4, 2012 in the name of Saint-Gobain Glass France.
Non-Final Office Action issued for U.S. Appl. No. 14/344,571 filed in the name of Sebastian Schmidt et al on May 21, 2014. Mail date: Sep. 23, 2014.
Notice of Allowance issued for U.S. Appl. No. 14/344,571 filed in the name of Sebastian Schmidt et al on May 21, 2014. Mail date: Apr. 13, 2015.
Non-Final Office Action issued for U.S. Appl. No. 14/344,578 filed in the name of Sebastian Schmidt et al on May 21, 2014. Mail date: Apr. 16, 2015.
Written Opinion issued for International Application No. PCT/EP2012/067196 filed in the name of Saint-Gobain Glass France on Sep. 4, 2012. Mail date: Dec. 5, 2012.
Written Opinion issued for International Application No. PCT/EP2012/067198 filed in the name of Saint-Gobain Glass France on Sep. 4, 2012. Mail date: Dec. 5, 2012.
Non-Final Office Action issue for U.S. Appl. No. 14/344,578 filed in the name of Sebastian Schmidt on May 21, 2014. Mailed Jul. 22, 2015.
Notice of Allowance for U.S. Appl. No. 14/344,578, filed May 21, 2014 on behalf of Sebastian Schmidt, et al. Mail Date: Jun. 6, 2016. 10 pages.

* cited by examiner

PILLAR COVERING FOR MOTOR VEHICLES

CROSS REFERENCE TO RELATED APPLICATIONS

The present application is the US national stage of International Patent Application PCT/EP2012/067199 filed on Sep. 4, 2012 which, in turn, claims priority to European Patent Application EP 11182543.6 filed on Sep. 23, 2011.

The invention relates to a pillar covering for motor vehicles and use thereof.

In the wake of increasingly stringent regulations on the carbon dioxide emission of motor vehicles, there are strong efforts to reduce the weight of a vehicle and, thus, its fuel consumption. Constant innovations in the area of plastics enable the replacement of large portions of the metal automobile body with correspondingly lighter elements made of polymer materials. In particular, parts or even the entire window area can be replaced by elements made of polymer materials. In many cases, these have, along with a significantly lower weight, comparable hardness, stability, and toughness as with a vehicle window made of steel. Additionally, due to the weight reduction, the center of gravity of the vehicle is moved lower, which has a positive effect on handling. Moreover, compared to metals, polymer materials can be produced, processed, and shaped at significantly lower temperatures. This reduces the energy demand and the costs during production of the materials.

Molded parts made of polymer materials can be produced in virtually any desired shape and geometry. Special high-performance plastics such as aramids, for example, Kevlar, have very high strengths and stabilities.

Many material parts made of plastics must satisfy various requirements and functions. Important parameters here are stability, fracture behavior, scratch resistance, impact strength, or notch impact strength. Besides technical considerations such as weight and strength of the individual components, shape, geometry, and appearance play an increasingly important role. Especially in the automobile industry, along with mechanical properties, characteristics in the area of design and of aesthetics are of great significance.

In order to combine various characteristics in polymer materials, they are composed of differently shaped and differently produced basic materials. Established methods for producing these materials include two-component or multicomponent injection molding. In this way, it is possible to combine characteristics such as weathering resistance, surface gloss, and fracture resistance or torsional stability. In addition, the proportions of very expensive materials can be reduced.

DE 196 33 959 A1 discloses a molded article comprising a support and an outer decorative film. The outer film has a decorative layer and a protective layer, with the protective layer consisting of a photopolymerizable resin composition.

WO 2006/094484 A1 discloses a method for producing a two-dimensional, plastic vehicle body part including two components. In a preferred embodiment, the first component is made of a transparent polycarbonate and the second component is made of an opaque polycarbonate.

DE 197 22 551 A1 discloses a method for producing plastic parts in the two-component injection molding process.

EP 1 695 808 A1 discloses a decorative part for a motor vehicle, for example, a trim strip. The decorative part comprises a carrier part made of a thermoplastic plastic and a cover part. The decorative part is preferably produced by a multicomponent injection molding process.

In order to further reduce the weight of the pillar covering, the protruding components, such as the window guide web, can be made thinner. In order to simultaneously increase stability and minimize the danger of breakage of the protruding thinned components, reinforcing ribs are injected from the outside in the thinned region. These reinforcing ribs can, however, only slightly increase the breakage resistance of the protruding, thinned component. In addition, externally injected reinforcing ribs can make the installation of the pillar covering more difficult due to the increased space requirement and can block the path of travel of possible tool slides.

The object of the invention is to provide a workpiece that has increased strength and breakage resistance in the region of a protruding and/or thinned component.

The object of the invention is accomplished by a pillar covering for vehicles according to claim 1. Preferred embodiments emerge from the subclaims.

The use according to the invention of the pillar covering for vehicles emerges from another independent claim. Preferred embodiments emerge from the subclaims.

The pillar covering for vehicles according to the invention comprises at least one polymer carrier part with an integrated window guide web and a mounting element. The polymer carrier part provides for the stability of the pillar covering and contains polymer materials, preferably thermoplastic polymers, with the highest possible strength, scratch resistance, impact strength, or notch impact strength and relatively low susceptibility to breakage. A window guide web protrudes from the actual carrier part and the precise dimensioning depends on the geometry of the corresponding workpiece on the vehicle body. The window guide web is preferably implemented approx. L-shaped and preferably has, in the protruding region, an angle of 45° to 135° relative to the base surface of the polymer carrier part. The window guide web preferably has, in both sub-webs of the "L", a respective length of 10 mm to 20 mm. The polymer carrier part further comprises a mounting element. The mounting element is, like the window guide web, a protruding element of the polymer carrier part and is preferably configured F-shaped. The precise shaping of the mounting element is determined by the corresponding opposing part of the vehicle body. The window guide web and the mounting element are preferably manufactured from the same material as the polymer carrier part and are preferably produced in the injection molding process using molds with corresponding cavities.

The window guide web and/or the mounting element has a thickness (measured over the entire component) of 0.5 mm to 3 mm as well as a raised circular, oval, or polygonal surface structure with a (mean) thickness of 0.2 mm to 1.5 mm. The thickness according to the invention of the window guide web and/or the mounting element of 0.5 mm to 3 mm effects an effective wall thickness thinning compared to known components (window guide web and/or the mounting element). The bottom wall of the window guide web and/or the mounting element thus thinned are reinforced by a honeycomb-like, circular, or polygonal raised surface structure, particularly preferably a hexagonal raised honeycomb-like surface structure. The raised surface structure ensures, even with thinning of the wall thickness, the stability and the breakage safety of the window guide web and/or of the mounting element. The wall thickness thinning also reduces the weight of the pillar covering.

A polymer cover part is connected to the polymer carrier part via a contact surface. The expression "contact surface" describes the boundary surface between the polymer carrier part and the polymer cover part. The polymer cover part can assume both decorative functions and functions in the area of tool resistance. Examples of this are surfaces or coatings that increase the weathering, UV, or chemical resistance of the pillar covering. The polymer carrier part and the polymer cover part form a common rounded end portion. In the context of the invention, the expression "end portion" preferably refers to a region in which the total thickness of the polymer carrier part and polymer cover part or their individual thicknesses decrease gradually or linearly. The polymer carrier part includes the mounting element, preferably opposite the end portion.

Depending on the geometry of the pillar covering, even further common, preferably rounded, end portions may be present. This edge geometry can be implemented circumferentially on all common edges of the polymer carrier part and polymer cover part inside the pillar covering or only on individual component edges. The entire pillar covering is preferably produced in one process step in a two-component or multicomponent injection molding process or multicomponent injection-compression molding process. In an alternative method, the polymer carrier part can be produced in one injection molding process with the narrowing and the window guide web. The polymer carrier part can subsequently be connected to a polymer cover part, likewise produced in an injection molding process.

The window guide web and/or the mounting element have, in an optional embodiment, the raised surface structure on regions of the window guide web and/or of the mounting element without wall thickness thinning, i.e., in optional regions of the window web guide with a thickness of more than 3 mm.

A narrowing is disposed preferably at the contact point of the window guide web with the carrier part. In the context of the invention, the expression "tapered" means a linear or gradual decrease in the thickness of the window guide web near or adjacent the base surface of the polymer carrier part. This decrease in thickness of the integrated window guide web ensures improved reflection optics on the visible side of the pillar covering and enables a reduction in the weight of the pillar covering and a savings of polymer starting material. The narrowing tapers preferably from 4 mm to 1 mm down to 2 mm to 0.2 mm. These dimensions permit high stability within the projection with simultaneously minimal weight. The projection preferably tapers over a length of 3 mm to 20 mm, preferably 5 mm to 10 mm on the above mentioned region. The narrowing permits a savings in material and weight of the finished component.

The pillar covering according to the invention particularly preferably contains stiffening ribs inside the tapered projection as well as reinforcing ribs in the region adjacent and outside the tapered projection. The stiffening ribs preferably are from 1 cm to 15 cm apart, preferably 2 cm to 10 cm. The stiffening ribs thus placed significantly increase the stability and breakage safety of the window guide web. The precise distance between the stiffening ribs further depends on the material used for the polymer cover part and the required stability of the pillar covering.

The window guide web preferably has, on the side opposite the narrowing, reinforcing ribs that further increase the stability of the window guide web.

The raised surface structure preferably has a tilt of 1° to 15° relative to the perpendicular on the surface of the window guide web and/or the mounting element below the surface structure. This draft angle improves the removal of the fracture-sensitive window guide web and/or of the mounting element from the injection mold.

The total thickness of the window guide web and the raised surface structure is preferably greater by a factor of 1.2 to 3 than the thickness of the underlying window guide web. The factor mentioned ensures an optimum weight-to-stability ratio of the window guide web.

The polymer carrier part contains preferably polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate (PET), preferably acrylonitrile-butadiene-styrene (ABS), acrylester-styrene-acrylonitrile (ASA), acrylonitrile-butadiene-styrene—polycarbonate (ABS/PC), and/or copolymers or mixtures thereof.

The polymer carrier part preferably contains inorganic or organic fillers, particularly preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the carrier part. In addition, the fillers can reduce the proportion of polymer materials and thus lessen the production costs of the component.

The polymer cover part preferably contains polycarbonates (PC), polymethyl methacrylate (PM MA), styrene-acrylonitrile (SAN), and/or copolymers or mixtures thereof. These polymers permit processing to high-gloss surfaces, glasslike in some cases, depending on the intended use.

The polymer cover part preferably includes a hard coat, particularly preferably thermal- or UV-curing coatings, particularly preferably polysiloxanes, polyacrylates, polymethacrylates, and/or mixtures or copolymers thereof. The hard coat improves the resistance to mechanical scratch damage, weathering effects, temperature fluctuations, UV radiation, and/or aggressive chemicals from the air or from spray water. In addition, the hard coat can even also assume decorative functions.

The polymer cover part preferably has a mean optical transparency of more than 60%, preferably more than 80% in the range from 400 nm to 800 nm. The high optical transparency gives the polymer cover part a glasslike appearance with only a low weight of its own and high ductility.

The mounting element is preferably configured F-shaped. The precise shaping of the mounting element is determined by the corresponding opposing part of the vehicle body.

The mounting element preferably has a sealing lip. The sealing lip enables a flexible and leakproof installation of the pillar covering in the vehicle.

The pillar covering according to the invention is preferably produced using a multicomponent injection molding process or a multicomponent injection-compression process.

The invention further includes the use of the pillar covering in vehicles, preferably motor vehicles, trucks, buses, particularly preferably as a trim strip in motor vehicles.

The invention is explained in detail in the following with reference to figures. The figures are purely schematic presentations and not to scale. They in no way restrict the invention.

Figure 2:
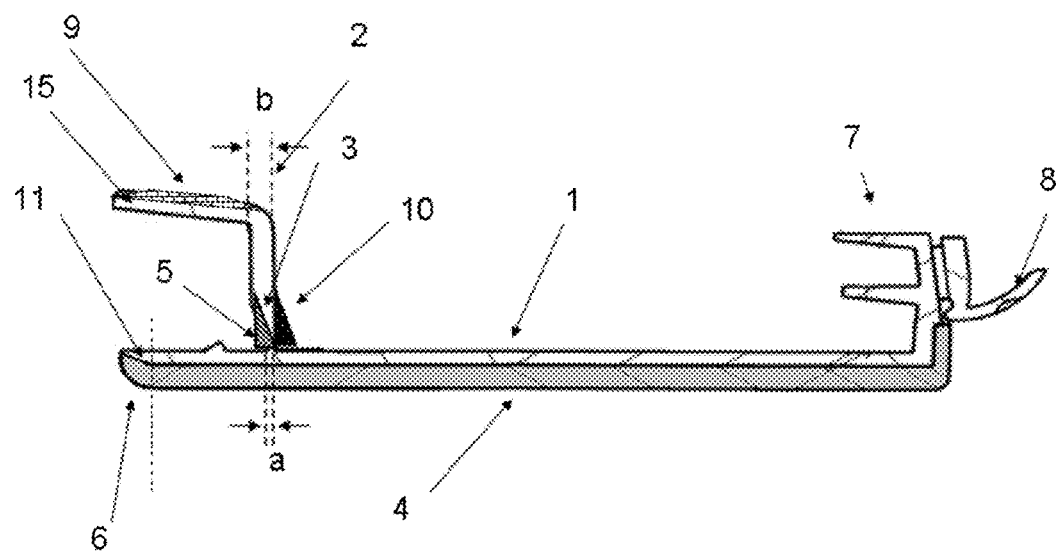
Figure 3:
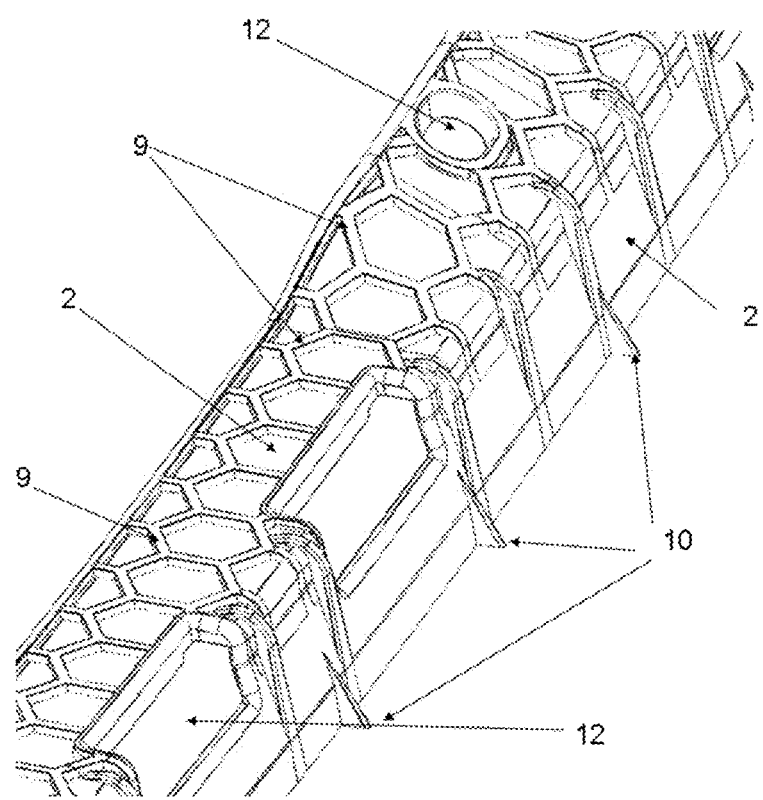
Figure 4:
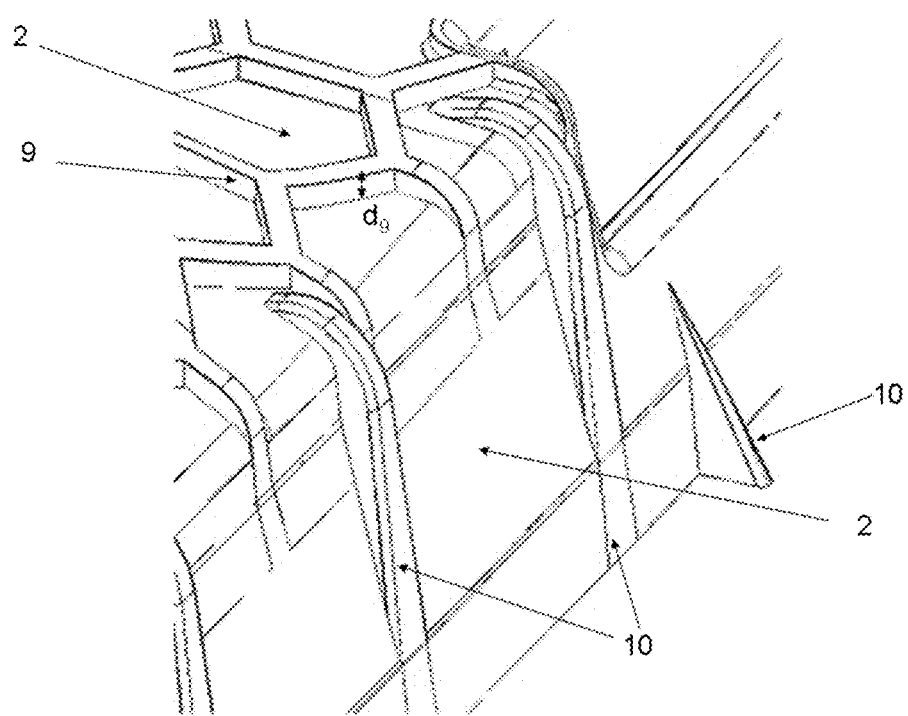
Figure 5:
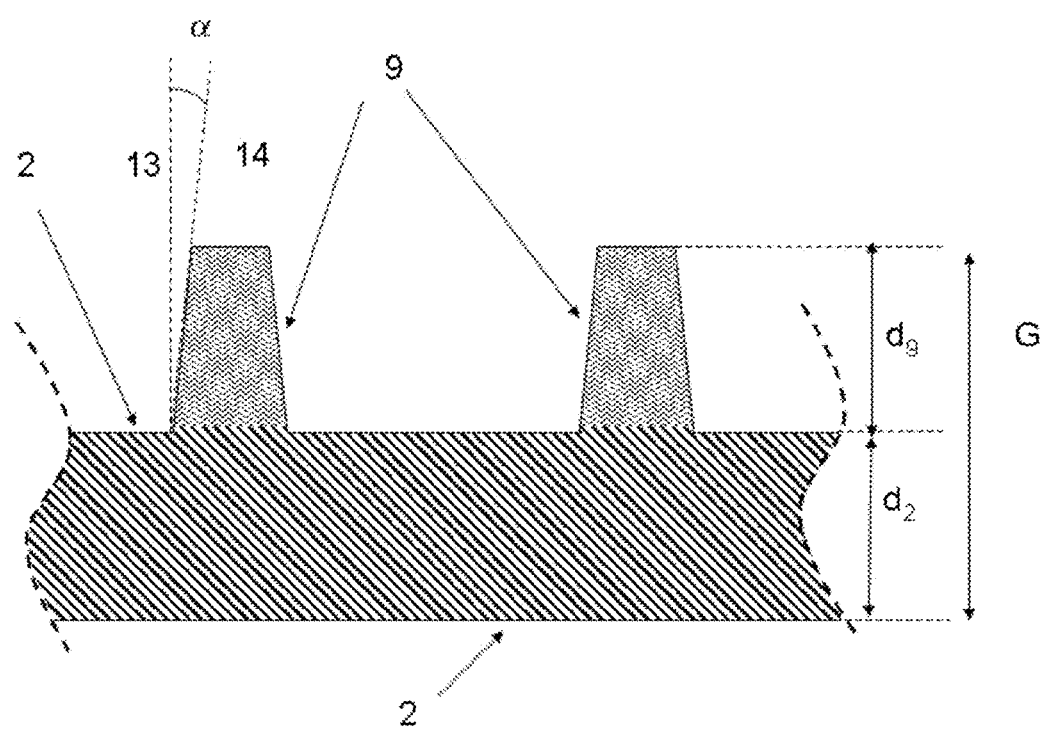
Figure 6:
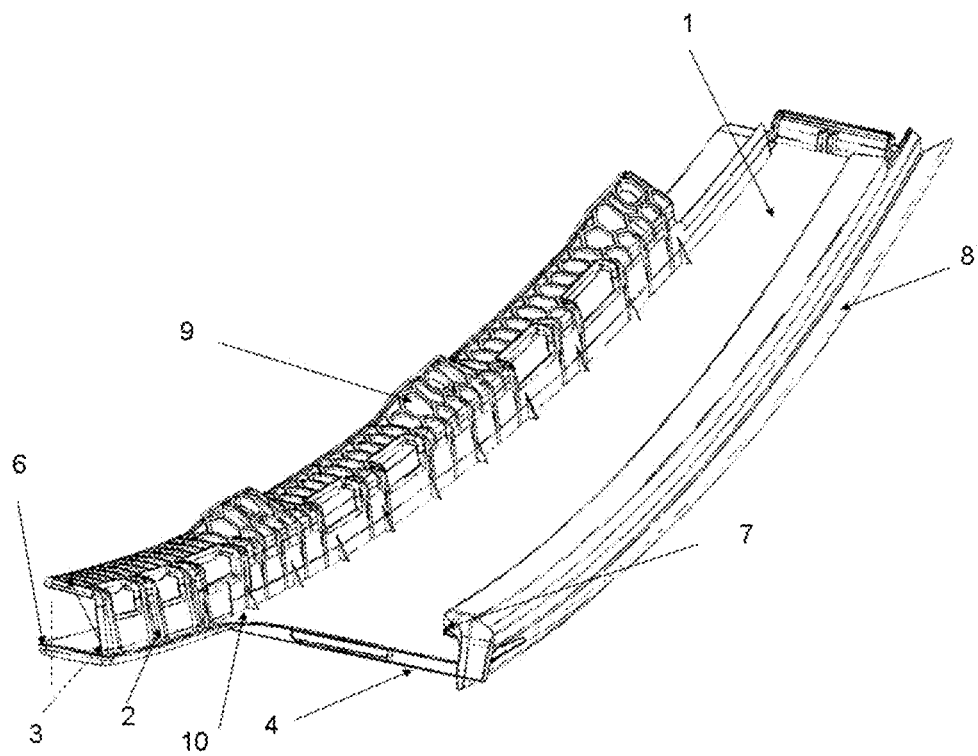

They depict:

FIG. 1 a cross-section of a pillar covering according to the prior art,

FIG. 2 a cross-section of a preferred embodiment of the pillar covering according to the invention, FIG. 3 an enlarged detail of the window guide web, FIG. 4 an enlarged detail of the surface structures,
FIG. 5 a cross-section of the surface structures, and
FIG. 6 a three-dimensional view of a preferred embodiment of the pillar covering.

FIG. 1 depicts a cross-section of a pillar covering according to the prior art. A polymer carrier part (1) with a molded window guide web (2) and an F-shaped mounting element (7) with a sealing lip (8) is surrounded by a polymer cover part (4). The window guide web (2) is connected via a narrowing (3) to the polymer carrier part (1). The region of the rounded end portion (6) (left of the dashed line) transitions gradually along the contact surface (11) into the polymer carrier part (1) and the polymer cover part (4). In the rounded end portion (6), the polymer cover part (4) encloses the polymer carrier part (1). Due to the different materials of the polymer cover part (4) and of the polymer carrier part (1), optical distortions and an irregular phase boundary at the contact surface (11) can occur during cooling after a 2-component injection molding process.

FIG. 2 depicts a schematic cross-section of a preferred embodiment of the pillar covering according to the invention. The basic structure composed of a polymer carrier part (1) with a window guide web (2), F-shaped mounting element (7) with a sealing lip (8), polymer cover part (4) corresponds to that depicted in FIG. 1. The window guide web (2) also has stiffening ribs (5) fitted inside the narrowing (3) and reinforcing ribs (10) fitted outside the narrowing (3). The window guide web (2) decreases inside the narrowing (3) from the larger starting diameter (b) to the smaller diameter (a). Surface structures (9) according to the invention are disposed on the surface of the window guide web (2). The reinforcing ribs (10) and especially the surface structures (9) increase the stability and breakage resistance of the window guide web (2).

FIG. 3 depicts an enlarged detail of the window guide web (2). Hexagonal, honeycomb-like surface structures (9) are disposed on the surface of the window guide web (2). The surface structures (9) and reinforcing ribs (10) significantly increase the stability and the load-bearing capacity of the window guide web (2). Various openings (12) also reduce the dead weight and material cost of the window guide web (2).

FIG. 4 depicts a further enlarged detail of the window guide web (2). The surface structures (9) and reinforcing ribs (10) are disposed as in FIG. 3.

FIG. 5 depicts a cross-section of the surface structures (9) on the window guide web (2). The surface structures (9) are inclined (14) by an angle a (alpha) of 1° to 15° relative to the perpendicular (13) on the surface of the window guide web (2). The inclination (14) of the surface structures (9) relative to the perpendicular (13) substantially reinforces the stability compared to a non-inclined surface web (9). Moreover, the inclination (14) by the angle a (alpha) permits better removal of the window guide web (2) after curing in the injection mold.

The variable ($d_9$) describes the thickness of the raised surface structure (9); ($d_2$), the thickness of the underlying window guide web (2). In addition, the ratio between the total thickness of $d_2$ plus $d_9$ to the thickness $d_2$ [($d_2+d_9)/d_2$] is preferably 1.2 to 3.

FIG. 6 depicts a three-dimensional view of a preferred embodiment of the pillar covering. The structure corresponds to that depicted in FIG. 2. The narrowing (3) cannot be seen due to the perspective. The raised, honeycomb-like reinforcing structures (9) are disposed on the surface of the window guide web (2) in the form of regular hexagons covering the surface. The reinforcing structures (9) reinforce the window guide web (2) and permit the reduction of the wall thickness of the window guide web (2). In addition, the surface structures (9) facilitate the ejection or the removal of the pillar covering according to the invention from the injection mold during production. The reinforcing ribs (10) effect a further stabilizing of the window guide web and can be disposed both with regular and irregular spacing on the outside of the window guide web (2). The region of the end portion (6) is indicated left of the dashed line.

LIST OF REFERENCE CHARACTERS (1) carrier part
(2) window guide web
(3) narrowing
(4) cover part
(5) stiffening ribs
(6) end portion
(7) mounting element
(8) sealing lip
(9) surface structure
(10) reinforcing ribs
(11) contact surface between carrier part and cover part
(12) openings in the window guide web
(13) perpendicular to the surface of the window guide web
(14) inclination of the surface structures relative to the perpendicular
($\alpha$) angle between the inclination of the surface structures and the perpendicular to the surface of the window guide web
(G) total thickness of the window guide web and the surface structure
($d_2$) thickness of the window guide web
($d_7$) thickness of the mounting element
($d_9$) thickness of the surface structure

The invention claimed is:

1. A pillar covering for vehicles, comprising:
a carrier part with a protruding integrated window guide web and a protruding mounting element;
a narrowing disposed at a point of contact of the window guide web with the carrier part;
a raised circular, oval, or polygonal surface structure on the window guide web and/or the mounting element; and
a polymer cover part connected to the carrier part via a contact surface,
wherein the window guide web and/or the mounting element has a thickness of 0.5 mm to 3 mm,
wherein the raised circular, oval, or polygonal surface structure has a thickness of 0.2 mm to 1.5 mm,
wherein the raised surface structure comprises a honeycomb-like raised surface structure,
wherein stiffening ribs are fitted inside the narrowing, without protruding from the narrowing, and
wherein a total thickness of the window guide web and of the surface structure is greater by a factor of 1.2 to 3 than the thickness of the underlying window guide web.

2. The pillar covering according to claim 1, wherein the narrowing tapers from 1 mm to 4 mm down to 0.2 mm to 2 mm.

3. The pillar covering according to claim 1, wherein the raised surface structure has a tilt of 1° to 15° relative to a perpendicular of an underlying surface of the window guide web.

4. The pillar covering according to claim 1, wherein the carrier part contains at least one of polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate, or copolymers or mixtures thereof.

5. The pillar covering according to claim 4, wherein the carrier part contains at least one of acrylonitrile-butadiene-styrene (ABS), acrylester-styrene-acrylonitrile (ASA), acrylonitrile-butadiene-styrene-polycarbonate (ABS/PC), or copolymers or mixtures thereof.

6. The pillar covering according to claim 1, wherein the carrier part contains inorganic or organic fillers.

7. The pillar covering according to claim 6, wherein the inorganic or organic fillers are $SiO_2$, $Al_2O_3$, $TiO_2$, clay minerals, silicates, zeolites, glass fibers, carbon fibers, glass beads, organic fibers, and/or mixtures thereof.

8. The pillar covering according to claim 1, wherein the cover part contains polycarbonates (PC), polymethyl methacrylate (PMMA), styrene-acrylonitrile (SAN), and/or copolymers or mixtures thereof.

9. The pillar covering according to claim 1, wherein the cover part includes a hard coat.

10. The pillar covering according to claim 9, wherein the hard coat is a thermal or UV curing coating.

11. The pillar covering according to claim 10, wherein the thermal or UV curing coating is polysiloxanes, polyacrylates, polymethacrylates, and/or mixtures or copolymers thereof.

12. The pillar covering according to claim 1, wherein the mounting element has a sealing lip.

13. The pillar covering according to claim 1, wherein the window guide web has reinforcing ribs.

14. A method comprising:
    using the pillar covering according to claim 1 in vehicles, preferably motor vehicles, trucks, buses, particularly preferably as a trim strip in motor vehicles.

15. The pillar covering according to claim 1, wherein the honeycomb-like raised surface structure is a hexagonally raised surface structure.

16. The pillar covering according to claim 1, wherein the mounting element is configured F-shaped.

* * * * *